(12) United States Patent
Goldberg

(10) Patent No.: US 6,219,453 B1
(45) Date of Patent: *Apr. 17, 2001

(54) METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM

(75) Inventor: Randy G. Goldberg, Princeton, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/909,200

(22) Filed: Aug. 11, 1997

(51) Int. Cl.⁷ ...................................................... G06K 9/72
(52) U.S. Cl. ......................... 382/229; 382/310; 704/251; 704/256
(58) Field of Search ..................................... 382/229, 231, 382/225, 218, 177, 187, 204, 309–311, 224; 704/243, 251, 257, 256, 255

(56) References Cited

U.S. PATENT DOCUMENTS

| | | |
|---|---|---|
| 3,466,394 | 9/1969 | French . |
| 3,752,904 | 8/1973 | Waterbury . |
| 3,896,266 | 7/1975 | Waterbury . |
| 3,988,715 | 10/1976 | Mullan et al. . |
| 4,718,102 | 1/1988 | Crane et al. . |
| 4,783,804 | 11/1988 | Juang et al. ........................... 704/245 |
| 4,817,156 | 3/1989 | Bahl et al. ............................ 704/256 |
| 4,819,271 | 4/1989 | Bahl et al. ............................ 704/256 |
| 4,908,865 | 3/1990 | Doddington et al. ................. 704/272 |
| 5,034,989 | 7/1991 | Loh ....................................... 382/189 |
| 5,050,215 | 9/1991 | Nishimura ............................. 704/244 |
| 5,101,345 | 3/1992 | MacPhail ................................ 707/1 |
| 5,125,022 | 6/1992 | Hunt et al. ............................. 379/88 |
| 5,127,043 | 6/1992 | Hunt et al. ............................. 379/88 |
| 5,167,016 | * 11/1992 | Bagley et al. ........................ 395/144 |

(List continued on next page.)

FOREIGN PATENT DOCUMENTS

| | | |
|---|---|---|
| 0 319 193 A2 | 6/1989 | (EP) . |
| WO 96 10795 | 4/1996 | (WO) . |
| 96 36042 | 11/1996 | (WO) . |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, vol. 85, No. 9, Sep. 1997; pp. 1437–1462.

*Primary Examiner*—Bhavesh Mehta
(74) *Attorney, Agent, or Firm*—Kenyon & Kenyon (57) ABSTRACT

A method and apparatus for correcting misrecognized words appearing in electronic documents that have been generated by scanning an original document in accordance with an optical character recognition ("OCR") technique. Each recognized word is generated by first producing, for each character position of the corresponding word in the original document, the N-best characters for occupying that character position. If an incorrect word is found in the electronic document, the present invention generates a plurality of reference words from which one is selected for replacing the incorrect word. This selected reference word is determined by the present invention to be the reference word that is the most likely correct replacement for the incorrect recognized word. This selection is accomplished by computing for each reference word a replacement word value. The reference word that is selected to replace the incorrect recognized word corresponds to the highest replacement word value.

35 Claims, 4 Drawing Sheets

U.S. PATENT DOCUMENTS

| | | | |
|---|---|---|---|
| 5,179,718 | 1/1993 | MacPhail | 707/514 |
| 5,216,720 | 6/1993 | Naik et al. | 704/272 |
| 5,255,310 | 10/1993 | Kim et al. | 379/88 |
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,418,717 * | 5/1995 | Su et al. | 364/419.08 |
| 5,452,397 | 9/1995 | Ittycheriah et al. | 395/2.49 |
| 5,455,889 | 10/1995 | Bahl et al. | 704/236 |
| 5,465,290 | 11/1995 | Hampton et al. . | |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 | 5/1996 | Courtney et al. | 382/159 |
| 5,526,465 | 6/1996 | Carey et al. | 704/250 |
| 5,566,272 | 10/1996 | Brems et al. | 704/231 |
| 5,577,164 | 11/1996 | Kaneko et al. . | |
| 5,613,109 | 3/1997 | Yamauchi et al. . | |
| 5,623,578 | 4/1997 | Mikkilineni | 704/255 |
| 5,642,519 | 6/1997 | Martin . | |
| 5,655,058 | 8/1997 | Balasubramanian et al. | 704/236 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,989 | 10/1997 | Rabin et al. . | |
| 5,677,990 | 10/1997 | Junqua . | |
| 5,680,509 | 10/1997 | Gopalakrishnan et al. | 704/270 |
| 5,680,511 * | 10/1997 | Baker et al. | 395/2.66 |
| 5,687,287 | 11/1997 | Gandhi et al. | 704/247 |
| 5,729,656 | 3/1998 | Nahamoo et al. | 704/254 |
| 5,745,555 | 4/1998 | Mark | 379/93.03 |
| 5,748,840 | 5/1998 | La Rue . | |
| 5,754,695 | 5/1998 | Kuo et al. . | |
| 5,764,799 * | 6/1998 | Hong et al. | 382/225 |
| 5,769,527 | 6/1998 | Taylor et al. | 362/85 |
| 5,781,882 | 7/1998 | Davis et al. | 704/221 |
| 5,794,042 | 8/1998 | Terada et al. . | |
| 5,797,123 | 8/1998 | Chou et al. . | |
| 5,799,269 | 8/1998 | Schabes et al. . | |
| 5,802,205 | 9/1998 | Emico et al. | 382/187 |
| 5,806,040 | 9/1998 | Vensko . | |
| 5,818,952 | 10/1998 | Takenouchi et al. . | |
| 5,829,000 * | 10/1998 | Huang et al. | 704/252 |
| 5,832,063 | 11/1998 | Vysotsky et al. . | |
| 5,841,901 | 11/1998 | Arai et al. . | |
| 5,850,480 | 12/1998 | Scanlon . | |
| 5,870,492 | 2/1999 | Shimizu et al. . | |
| 5,875,108 | 2/1999 | Hoffberg et al. | 364/146 |
| 5,889,897 * | 3/1999 | Medina | 382/309 |
| 5,903,864 | 5/1999 | Gadbois et al. . | |
| 5,913,196 | 6/1999 | Talmor et al. . | |
| 5,937,385 | 8/1999 | Zadrozny et al. . | |

* cited by examiner

METHOD AND APPARATUS FOR PERFORMING AN AUTOMATIC CORRECTION OF MISRECOGNIZED WORDS PRODUCED BY AN OPTICAL CHARACTER RECOGNITION TECHNIQUE BY USING A HIDDEN MARKOV MODEL BASED ALGORITHM

BACKGROUND INFORMATION

The present invention is directed to a method and system for correcting misrecognized words in electronic documents that have been produced by an optical character recognition system that scans text appearing on a physical medium, and in particular, to a method and system that relies on a Hidden Markov Model-based algorithm to select for each misrecognized word a replacement word with the highest probability of matching the word in the original document that the misrecognized word was intended to match.

Devices that are used in conjunction with optical character recognition ("OCR") techniques have been in use for some time. Examples of such devices are optical scanners and facsimile machines. What is common to both of these types of devices is that they each scan a physical document bearing printed or handwritten characters in order to produce an electronic image of the original document. The output image is then supplied to a computer or other processing device, which performs an OCR algorithm on the scanned image. The purpose of the OCR algorithm is to produce an electronic document comprising a collection of recognized words that are capable of being edited. The electronic document may be formatted in any one of a plurality of well known applications. For example, if the recognized words are to be displayed on a computer monitor, they may be displayed as a Microsoft Word® document, a WORDPERFECT® document, or any other text-based document. Regardless of how the recognized words of the electronic document are formatted, the recognized words are intended to correspond exactly, in spelling and in arrangement, to the words printed on the original document.

Such exact correspondence, however, does not always occur; as a result, the electronic document may include misrecognized words that never appeared in the original document. For purposes of this discussion, the term "word" covers any set of characters, whether or not the set of characters corresponds to an actual word of a language. Of course, when the phrase "actual word" is used in this discussion, what is meant is that the word comprises a cognizable, intelligible word of the English, or any other, language. Moreover, the term "word" covers sets of characters that include not only letters of the alphabet, but also numbers, punctuation marks, and such typographic symbols as "$", "&", "#", etc. Thus, a misrecognized word may comprise a set of characters that does not comprise an actual word, or a misrecognized word may comprise an actual word that does not have the same spelling as that of the corresponding word in the scanned document. For example, the word "got" may be misrecognized as the non-existent word "qot", or the word "eat" may be misrecognized as "cat." Such misrecognized words, whether they comprise a real word or a mere aggregation of characters, may be quite close in spelling to the words of the original document they were intended to match. The cause of such misrecognition errors is largely due to the physical similarities that exist between certain letters of the alphabet. For example, as discussed above, such errors may occur when the letter "g" is confused with the physically similar letter "q". Another common error that OCR algorithms make is confusing the letter "d" with the two-letter combination of "ol." The physical resemblance of certain characters is not the only cause of recognition errors, however. For example, the scanning device may include a faulty optical system or a defective charge-coupled device (CCD); the original document may be printed in a hard-to-scan font; or the original document may include scribbles and marks that obscure the actual text.

Certain techniques have been implemented in order to detect and correct such misrecognition errors. For example, if the electronic document containing the recognized words is formatted in a word processing application, a user viewing the document may use the spell checking function provided by the word processing application to correct any words that have been misspelled. Some of these word processing applications also provide a grammar checker, which would identify words that, although spelled correctly, do not belong in the particular sentences in which they appear.

A drawback to these techniques is that a user must manually implement these correction techniques because spell checkers and grammar checkers operate by displaying to the user a list of possible words that may include the correct word. By manipulating an appropriate sequence of keys or other data input means, a user must select from this list what he believes to be the correct word and implement the appropriate commands for replacing the misrecognized word with the selected word. Such a correction technique is time-consuming, and moreover, is prone to human error because in carrying out such operations, the user may inadvertently select an inappropriate word to replace the misrecognized word. What is therefore needed is a correction technique that automatically replaces each misrecognized word with the word most likely matching the corresponding word in the original document. Such a correction technique would not require user intervention.

SUMMARY OF THE INVENTION

In order to overcome the above-mentioned disadvantages found in previous techniques for correcting misrecognized words, the present invention is directed to a method and apparatus that automatically substitutes each misrecognized word with a dynamically generated replacement word that has been determined to be the most likely correct word for replacing the misrecognized word. The recognized words may be based on words appearing on a physical medium (e.g., words printed on a sheet of paper) that has been optically scanned. For each character position of a word appearing in an original document, the present invention generates the N-best characters for occupying that character position. The present invention then generates a recognized word based on the N-best characters for each character position of the original word. The present invention then determines whether each recognized word is correct by executing either a spell checking algorithm, a grammar checking algorithm, a natural language algorithm, or any combination thereof. For each incorrect recognized word, the present invention retrieves from memory the previously generated sets of N-best characters from which the incorrect recognized word was formed. The present invention then generates every possible word that can be generated from the characters included in the retrieved sets of N-best characters. Each of these generated words is referred to as a reference word. The incorrect misrecognized word is replaced by one of these reference words. In order to determine which reference word is to replace the incorrect recognized word, the present invention computes for each reference word a value that reflects the likelihood that the reference word matches the corresponding word appearing on the physical medium. The present invention replaces the incorrect recognized word with the reference word having the greatest likelihood of matching the corresponding word appearing on the physical medium.

DETAILED DESCRIPTION OF THE INVENTION

Figure 1:
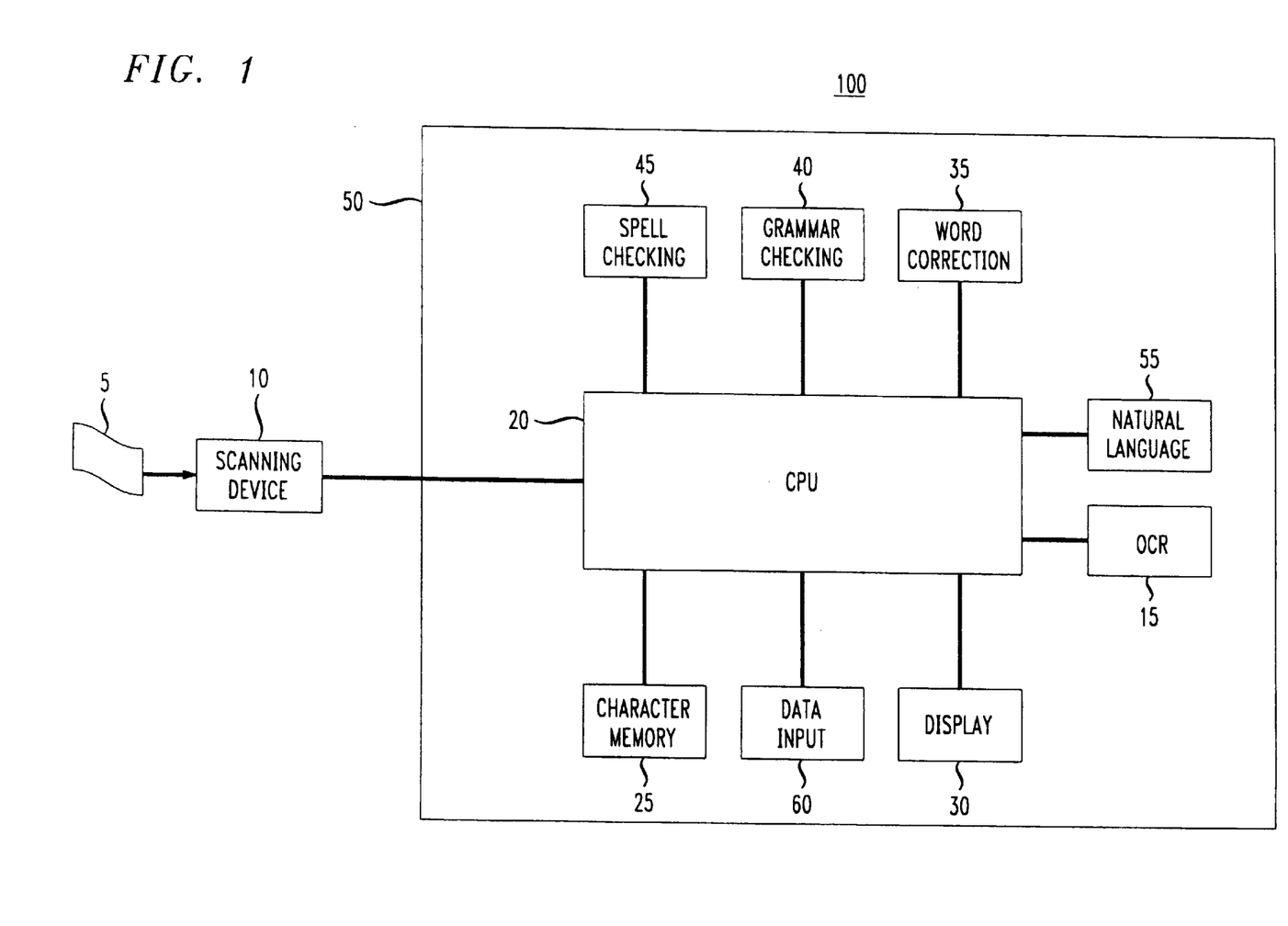
FIG. 1 illustrates a block diagram of an apparatus according to the present invention.

FIG. 1 illustrates a system that implements the word correction routine of the present invention. The system of FIG. 1 is merely an example of one kind of system that is capable of supporting the present word correction routine, and it should be appreciated that the present word correction routine is compatible with numerous other applications.

The system 100 of FIG. 1 includes a document scanning device 10, which may comprise an optical scanner or a facsimile machine. Scanning device 10 scans an input original document 5 and generates an image signal that is representative of the characters appearing on document 5. Scanning device 10 supplies the image signal to processing device 50, which may comprise a general purpose computer. Processing device 50 may be located remotely from the scanning device, or processing device 50 and scanning device 10 may be integrated together into a unitary apparatus, depending on the particular needs and requirements of the application in which these devices are to be implemented.

Processing device 50 includes a central processing unit 20 ("CPU"). Associated with CPU 20 are a display 30, a data input device 60, an optical character recognition module 15, a word correction module 35, a character memory 25, a spell checking module 45, a grammar checking module 40, and a natural language understanding module 55. A user first inputs a document 5 into a scanning device 10, which scans the document 5 and generates an image signal representative of the scanned document. The image signal is then transmitted to CPU 20, which uses OCR module 15 to perform an optical character recognition algorithm on the received image signal. After performing the OCR algorithm on the image signal, OCR module 15 creates an electronic document that includes recognized words intended to correspond exactly, in spelling and in arrangement, to the words appearing in the original document 5.

The OCR module 15 of the present invention may be implemented by using a Hidden Markov Model-based algorithm to generate the recognized words of the electronic document. As an example, the character recognition algorithm used in OCR module 15 may be implemented as any existing OCR algorithm that is configured as a Hidden Markov Model-based application, such as Pages Pro 97™ by XEROX or Paper Port™ by VISIONEER. In order to demonstrate how OCR module 15 initially generates each of the recognized words of the electronic document, assume that the word "blink" appears in original document 5. The scanning device 10 produces an image of this word and transmits this image signal (along with image signals corresponding to the other words of document 5) to CPU 20, which executes the algorithm stored in module 15. For each character position in the image signal, the algorithm of module 15 generates the N-best characters for occupying that character position. Alternatively, the algorithm at this processing stage may instead generate for each character position only the best character for occupying that position. For example, assuming that the OCR module 15 is programmed to generate the three best characters for each character position, the algorithm may process the scanned word "blink" by generating the following character sets:

| First Choice:  | b | l | I | n | k |
| Second Choice: | d | t | j | m | x |
| Third Choice:  | c | g | a | w | h |

After generating these character sets, the algorithm of OCR module 15 inserts the First Choice word, "blink," into the electronic document and proceeds to perform the same procedure for the received image signal corresponding to the next scanned character or set of characters of original document 5. It should be noted that the above-described technique of generating the N-best characters for each character position can be implemented using existing software, such as the ones mentioned above from XEROX or VISIONEER. Moreover, the present invention is compatible not only with such Hidden Markov Model-based software, but with any software that is capable of generating for each character position of a word the N-best characters for occupying that character position.

As explained before, the words of the electronic document generated by conventional OCR software do not always match exactly, in spelling and in arrangement, the corresponding word of original document 5. Thus, the First Choice word generated above may not match the spelling of the word "blink." The present invention provides various algorithms that detect and correct such misrecognition errors. These algorithms are maintained in word correction module 35. In order to discuss these algorithms of the present invention, reference is made to FIGS. 2–4. It is to be noted that for each of the algorithms in FIGS. 2–4, CPU 20 acts in accordance with the instructions of word correction module 35.

Figure 2:
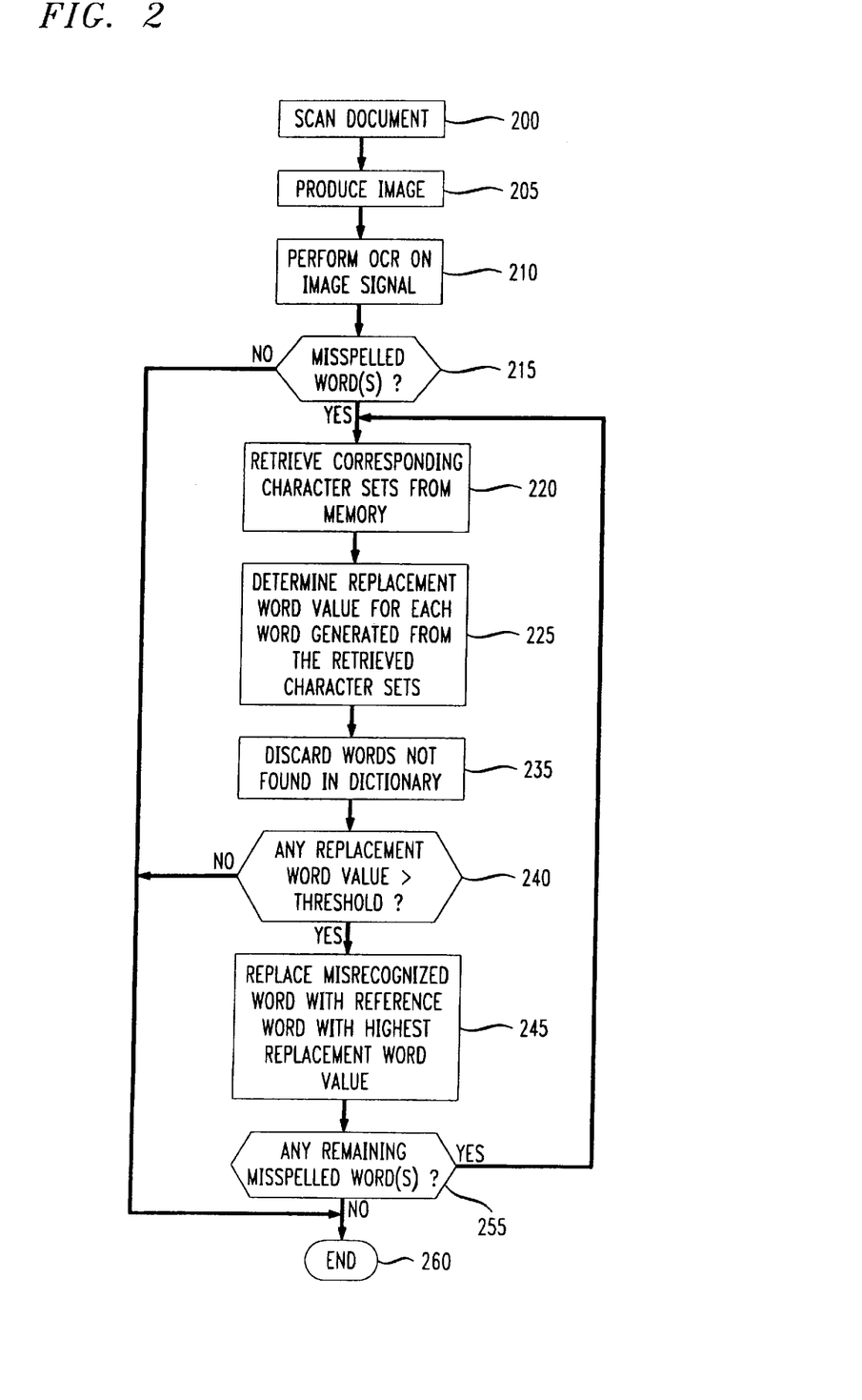
FIG. 2 illustrates a flow diagram for replacing a misrecognized word with a reference word according to a first embodiment of the present invention.

With respect to FIG. 2, scanning device 10 scans an original document 5 (step 200) and generates an image signal representative of the characters appearing in document 5 (step 205). Scanning device 10 provides this image signal to processing device 50. CPU 20 then executes a conventional OCR algorithm stored in module 15 on the received image signal as explained above (step 210). That is, for each character position of the received image signal, the algorithm generates the N-best characters for occupying that character position. As an alternative at this stage of the processing, the algorithm in module 15 may instead generate only the best-choice character for occupying each scanned character position of original document 5. Assuming, however, that in the example of FIG. 2 the N-best characters have been generated for each character position, the algorithm of OCR module 15 selects the First Best Choice for each character position and inserts the resulting word in the electronic document. The complete set of N-best character sets for each scanned word is maintained in character memory 25.

Based on the software of word correction module 35, CPU 20 then executes on the electronic document a spell checking algorithm maintained in module 45 (step 215). This spell checking algorithm may correspond to the conventional spell checking functions that are available in such word processing applications as WORD® or WORDPERFECT®. The present invention, however, does not use all of the functions afforded by such conventional spell checking functions. In particular, the present invention incorporates the function of identifying which words in an electronic document have been misspelled; this function may be implemented as a dictionary comparison algorithm, in which each recognized word is checked to see if is it appears in a pre-stored dictionary. The present invention does not need to use the ability of such well-known spell checking algorithms to generate for each incorrect word a list of alternative words from which a user manually selects a replacement. Instead, the present invention relies on a different method of replacing incorrectly spelled words.

Returning to FIG. 2, if the spell checking algorithm does not detect any misrecognized words, the operation ends (step 260). If, on the other hand, the spell checking algorithm detects the presence of a misrecognized word (step 215), the software maintained in module 35 causes CPU 20 to retrieve from memory 25 the N-best character sets that were originally generated by OCR module 15 for the misrecognized word. Alternatively, if the OCR module 15 originally generated only the best character for occupying each character position of the misrecognized word, the software maintained in module 35 may be programmed to cause OCR module to generate the remaining N-1 best characters for occupying each character position of the misrecognized word. Assume in this example that the N-best character sets are generated at the same time. Further assume that when the image signal for the word "blink" was provided to OCR module 15, the following N-best characters were generated for each character position of the associated image signal:

| First Set  | d | t | I | n | k |
|------------|---|---|---|---|---|
| Second Set | b | l | j | m | g |
| Third Set  | c | h | a | r | e |

In this example, N has been selected to be three. As explained before, after the Hidden Markov Model algorithm stored in module 15 generates these character sets, the algorithm selects the First Set, "dtink" for insertion into the electronic document, and CPU 20 stores these character sets in memory 25. When the spell checking algorithm is subsequently executed on this electronic document, the word "dtink" is flagged as misspelled because the spell checking algorithm will not be able to find this word in its stored dictionary. At this point, CPU 20, acting in accordance with word correction module 35, retrieves the above-identified character sets corresponding to the word "dtink" (step 220). By executing an alignment algorithm, CPU 20 generates every possible word that can be generated from the characters included in these character sets. These generated words are referred to as reference words. While generating each of these reference words, CPU 20 associates a probability with each character of each reference word. These probabilities may be provided by word correction module 35, or, instead, the OCR module 15 may be modified to provide these probabilities. For instance, for characters drawn from the First Set, CPU assigns to them a probability of 80%, or 0.80; for characters drawn from the Second Set, CPU 20 assigns to them a probability of 40%, or 0.40; for characters drawn from the Third Set, CPU 20 assigns to them a probability of 20%, or 0.20. This ranking of probabilities is pre-programmed into the word correction module 35, and it is determined empirically based on trial runs of the OCR algorithm maintained in module 15. If the module 15 is replaced with another OCR algorithm, a new set of probabilities tailored to the new OCR algorithm would have to be used. This new set of probabilities may be entered into processing device 50 through data input device 60, or instead, a plurality of sets of probabilities, each corresponding to a different OCR algorithm, may be pre-stored at the same time. In this situation, when a new OCR algorithm is implemented, a user may simply enter a command through data input device 60 to activate the corresponding set of probabilities. Further, although this discussion has focused on using probabilities, it will be appreciated that the sets of characters generated by the OCR algorithm may be associated with other scores or values besides probabilities, so long as these scores or values are capable of representing the relative likelihood that a particular character generated by OCR module 15 corresponds to an actual character found in the corresponding word of original document 5. These probabilities, scores, or other values are referred to herein as character values.

As explained above, for each reference word that CPU 20 generates from the N-best sets of characters, the word correction module 35 requires CPU 20 to assign to each character in the reference word a probability (or other score, value, etc.). Once CPU 20 has assigned a probability to each character in a generated reference word, it multiplies all the probabilities for that reference word to arrive at a reference word recognition value (step 225), which is an example of a replacement word value. Another type of replacement word value, which is referred to as a composite value, will be discussed in connection with FIGS. 3 and 4. In order to explain how each reference word recognition value is generated, assume that one of the reference words generated from these character sets is the word "dlark." Each of the characters of the word "dlark" has been underlined below to illustrate from which character set each letter was drawn.

| First Set (80%)  | d̲ | t | I | n | k̲ |
|------------------|---|---|---|---|---|
| Second Set (40%) | b | l̲ | j | m | g |
| Third Set (20%)  | c | h | a̲ | r̲ | e |

The reference word recognition value for "dlark" is determined as follows. The letter "d" is drawn from the First Set of characters; therefore it is associated with a probability of 0.80. The letter "l" is drawn from the Second Set of characters; therefore, it is associated with a probability of 0.40. The letter "a" is drawn from the Third Set of characters; therefore, it is associated with a probability of 0.20. The letter "r" is drawn from the Third Set of characters; therefore, it too is associated with a probability of 0.20. The letter "k" is associated with the First Set of characters; therefore, it is associated with a probability of 0.80. Multiplying all the probabilities together, CPU 20 arrives at the following reference word recognition value: $(0.8)(0.4)(0.2)(0.2)(0.8)=0.01024$. Of course, the reference word recognition value may be determined in ways other than by multiplying the probabilities. The present invention is deemed to encompass alternative methods, mathematical or otherwise, of determining reference word values that are based on probabilities, scores, or other values. For example, instead of multiplying probabilities in order to generate a reference word recognition value, the present invention may instead add these values according to a predetermined calculation.

Once each generated reference word has been assigned a reference word recognition value, CPU 20 performs a dictionary look-up by using the stored dictionary of the spell checking module 45. CPU 20 discards those reference words that are not found in the dictionary (step 235). As an alternative, the step of discarding reference words not found in the dictionary may be performed before determining the reference word recognition values so that only those words that are present in the dictionary are actually assigned a reference word recognition value. In the above example, assume that the two reference words that are found in the dictionary are "blink" and "clang." The characters in "blink" are distributed within the three character sets as follows:

| First Set (80%)  | d | t | I | n | k |
|---|---|---|---|---|---|
| Second Set (40%) | b | l | j | m | g |
| Third Set (20%)  | c | h | a | r | e |

Thus, the reference word recognition value for blink is $(0.40)(0.40)(0.80)(0.80)(0.80)=0.08192$.

For the reference word "clang," the characters are distributed within the three character sets as follows:

| First Set (80%)  | d | t | I | n | k |
|---|---|---|---|---|---|
| Second Set (40%) | b | l | j | m | g |
| Third Set (20%)  | c | h | a | r | e |

Thus, the reference word recognition value for "clang" is $(0.20)(0.40)(0.20)(0.80)(0.40)=0.00512$.

After generating a reference word recognition value for each reference word and discarding those words that are not found in a pre-stored dictionary, CPU 20 determines whether any of the reference word recognition values exceeds a predetermined threshold value (step 240). This threshold value is empirically determined, and it signifies the probability level below which an associated reference word could not plausibly be considered as a replacement for the misrecognized word. If no reference word is associated with a reference word recognition value higher than the predetermined threshold, then the misrecognized word is not replaced and CPU 20 concludes its operation (step 260). If at least one reference word recognition value exceeds the threshold, CPU 20 then deletes the misrecognized word from the electronic document and replaces it with the reference word having the highest reference word recognition value (step 245). In the current example, the misrecognized word would be replaced by "blink" and not "clang" because "blink" is associated with the higher of the reference word recognition values.

Figure 3:
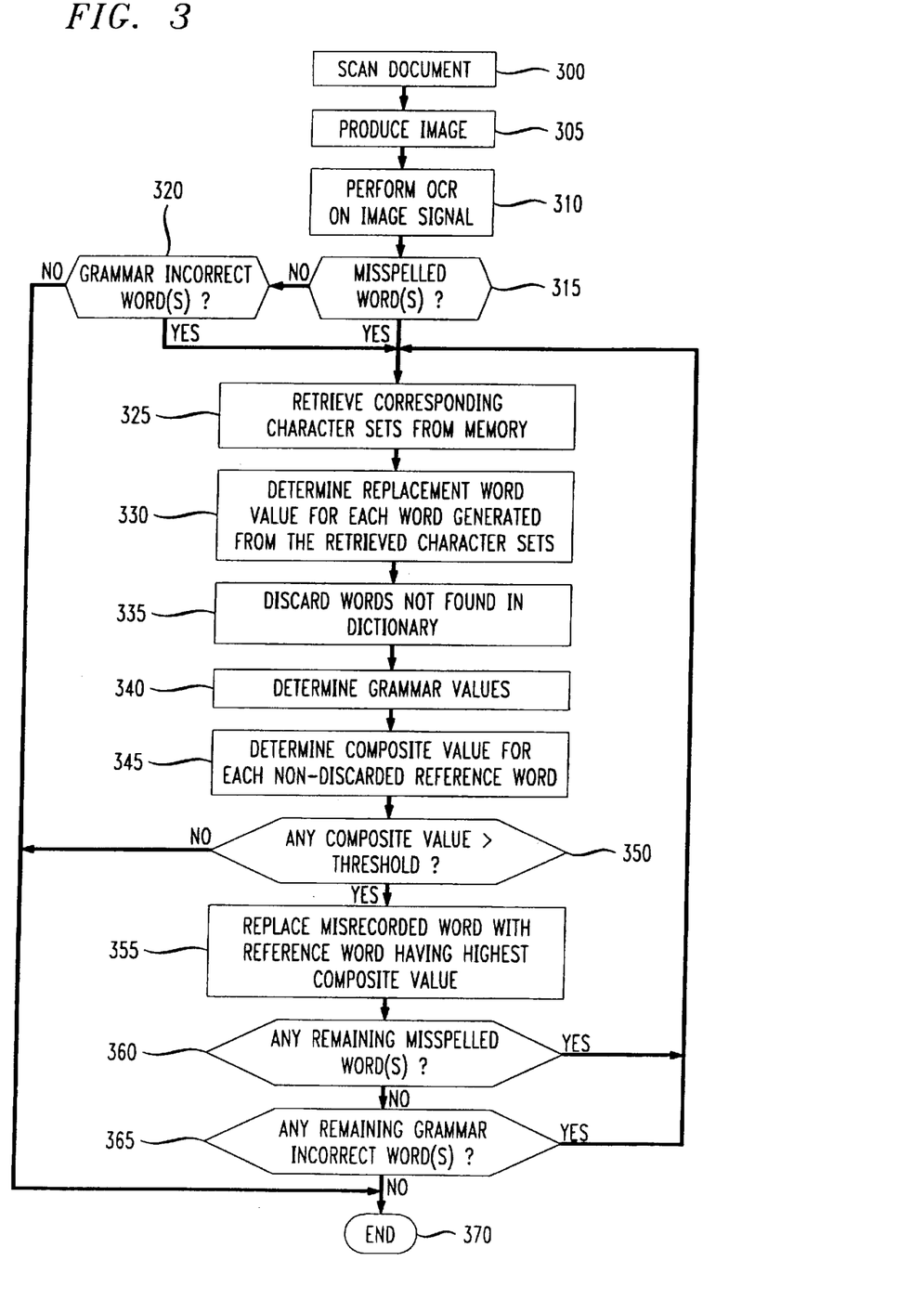
FIG. 3 illustrates a flow diagram for replacing a misrecognized word with a reference word according to a second embodiment of the present invention.

FIG. 3 illustrates another possible algorithm that may be maintained in word correction module 35. This algorithm addresses the situation in which the electronic document produced by OCR module 15 includes no misspelled words, but does include grammatically incorrect words. In order to provide this capability, the algorithm of FIG. 3 incorporates the grammar checking algorithm maintained in module 40, which may correspond to the type of grammar checking algorithm that is normally available in such word processing applications as WORDS® or WORDPERFECT®. This grammar checking algorithm identifies the structure of each sentence to determine the relative likelihood that a particular word position in the sentence should be occupied by a noun, verb, adjective, adverb, etc. One way that the grammar checking algorithm establishes this relative likelihood is by assigning to each part of speech a particular percentage. Thus, for example, after identifying a word as incorrect, the grammar checking algorithm will generate a probability of 65% that the correct word is a noun, a 20% probability that the correct is a verb, and a 15% probability that the correct word is an adjective. The system of FIG. 1 incorporates this capability of the grammar checking algorithm in order to provide another way to realize the word correction capabilities of the present invention.

As with the previously described algorithms, the operation represented in FIG. 3 begins with scanning an original document 5 (step 300), producing an image signal based on the scanned document (step 305), and performing an OCR algorithm on the image signal (step 310). CPU 20 then uses the spell checking module 45 to determine if any words in the electronic document are not found in the spell checking module's dictionary (step 315). Assume that no misspelled words are found. In the algorithm of FIG. 2, the operation would have terminated at this point. In the algorithm of FIG. 3, CPU executes the grammar checking algorithm of module 40. let Assume that in the electronic document the following grammatically incorrect sentence appears: "I want to fat a cake." Obviously, the grammatically incorrect word in this sentence, "fat", should be changed to "eat", but spell checking module 45 would not flag such a word because "fat" is a correctly spelled word. That is why it is necessary to perform a grammar check in step 320 to analyze the grammatical structure of each sentence in the electronic document. After performing such an analysis on the sentence in this example, CPU 20 would detect that the text position occupied by "fat" most likely should be a verb, not an adjective. After flagging the word "fat" as grammatically incorrect, CPU 20 would retrieve from memory 25 the corresponding N-best character sets for the misrecognized word "fat" and, based on these character sets, CPU 20 would generate every possible reference word from the characters of the retrieved character sets (step 325). CPU 20 would then determine, in the manner discussed above, a reference word recognition value for each of the reference words (step 330). Next, CPU 20 would discard all those reference words that are not found in the pre-stored dictionary (step 335). After doing so, CPU 20 would cause the grammar checking module 40 to generate a plurality of grammar values, each one corresponding to a different part of speech; for instance, the grammar checking algorithm may determine that for the text position occupied by the word "fat", there is an 85% chance that the correct word is a verb, a 10% chance that it is a noun, and a 5% chance that it is an adjective (step 340). As with the reference word recognition value, the grammar values are not limited to probabilities, but instead may encompass any score or value that measures the relative likelihood that a particular word position is occupied by a particular part of speech.

Continuing with respect to FIG. 3, each reference word recognition value would be multiplied by the grammar value corresponding to the part of speech of the associated reference word (step 345). Thus, if the reference words "bat," "cat," and "eat" have been generated for the misrecognized word "fat," the reference word recognition value for both "bat" and "cat" would be multiplied by the grammar probability for nouns, which in this case is 10%, and the reference word recognition value for "eat" would be multiplied by 85%, the grammar probability for verbs. The product of this multiplication is referred to as a composite value, which as stated before is an example of a replacement word value. Of course, the composite value need not be determined by multiplying the reference word recognition values with the grammar values, but instead it may be determined according to any suitable method that produces a value that is a function of the reference word recognition value and the grammar value. Assuming that at least some of the resulting composite values exceed a predetermined threshold (step 350), the grammatically incorrect word would be replaced by the reference word associated with the highest composite value (step 355).

Figure 4:
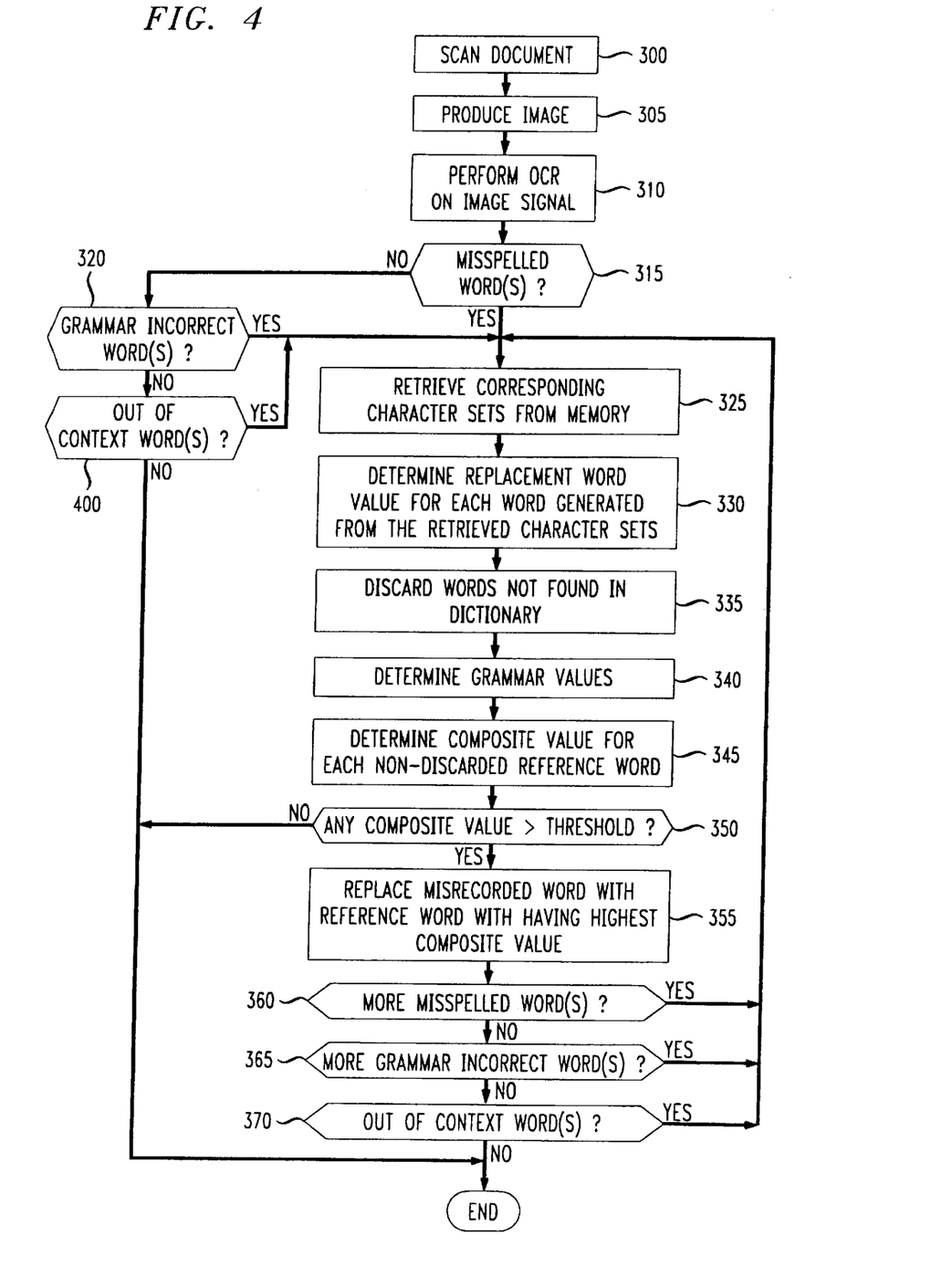
FIG. 4 illustrates a flow diagram for replacing a misrecognized word with a reference word according to a third embodiment of the present invention.

CPU 20 also may employ a natural language understanding algorithm, which is maintained in module 55 and which may correspond to NL ASSISTAN™ natural language application by UNISYS CORPORATION. What is common to all of these natural language algorithms is that they each can flag words that, although grammatically correct, are nevertheless out of context. For example, if the recognized sentence is "I hit the baseball with my cat", neither the spell checking algorithm nor the grammar checking algorithm would determine that "cat" is incorrect and should be changed to "bat". Because the natural language algorithm analyzes the context within which each word appears, it would determine that the word "cat" does not belong in the sentence. As a consequence, a list of reference words would be generated in the same manner as discussed above, one of which would presumably be "bat". CPU 20 would then generate for each word in this list a reference word recognition value (and, if desirable, a composite value) in the same manner as discussed before. As an example, with respect to the algorithm of FIG. 3, a natural language algorithm may be implemented as an additional step after the grammar check step 320 (step 400). Thus, in this example, a recognized word would first be analyzed for spelling, then grammar, and then context, and if any of these checking algorithms flags the recognized word as incorrect, then reference words would be generated (step 325) and the word checking algorithm would proceed in the same manner as discussed above. This modification of FIG. 3 is shown in FIG. 4.

As is evident from this discussion, the present invention is broadly directed to a word correction system that replaces each misrecognized word with a word that most likely matches the corresponding word in an original document. This system is thus compatible with any recognition technique that is capable of generating a set of words from which the most likely replacement for the misrecognized word is selected. Moreover, as explained before, the present invention may be used in conjunction with a wide variety of applications for detecting misrecognized words. Thus, the present invention is capable of detecting misrecognized words on the basis of a spell checking algorithm, a grammar checking algorithm, a natural language algorithm, or any combination thereof.

What is claimed is:

1. A method of recognizing at least one word in a document, the word including at least one predetermined character, the method comprising the
    a) providing a recognized word based on the word in the document;
    b) determining whether the recognized word matches the word in the document, the recognized word comprising a misrecognized word in the absence of a match with the word in the document;
    c) if the determining step produces the misrecognized word, generating a set of reference words, wherein each one of the reference words comprises a different set of characters;
    d) determining for each of the reference words a corresponding replacement word value;
    e) prior to selecting the reference word for replacing the misrecognized word, reducing an amount of reference words from the set of reference words in order to form a subset of reference words from the set of reference words by eliminating according to an elimination operation any reference word that does not belong to a predetermined vocabulary, the subset of reference words being limited to only those reference words that belong to the predetermined vocabulary, the elimination operation being different than the generating of the set of reference words; and
    f) selecting from the subset of reference words one reference word for replacing the misrecognized word based on the replacement word values of the corresponding reference words in the subset of the reference words.

2. The method according to claim 1, wherein each one of the at least one word in the document, the recognized word, and each of the reference words comprises a plurality of alphanumeric characters.

3. The method according to claim 1, wherein each one of the at least one word in the document, the recognized word, and each one of the reference words comprises a plurality of numbers.

4. The method according to claim 1, wherein each one of the at least one word in the document, the recognized word, and each one of the reference words comprises a plurality of alphabetical letters.

5. The method according to claim 1, wherein each one of the at least one word in the document, the recognized word, and each one of the reference words includes at least one typographic symbol.

6. The method according to claim 1, wherein the subset of reference words includes only actual words.

7. The method according to claim 6, wherein the step a) comprises:
    i) providing, for every character position of the word in the document, a set of N-best characters for occupying that character position, wherein N is an integer greater than zero; and
    ii) generating the recognized word based on the set of N-best characters provided for every character position of the word in the document.

8. The method according to claim 7, wherein the step b) comprises determining whether the recognized word is spelled correctly, and wherein each of the reference words is determined based on the set of N-best characters provided for every character position of the word in the document.

9. The method according to claim 8, further comprising the step of associating a character value with each one of the N-best characters provide for every character position of the word in the document.

10. The method according to claim 9, wherein the step d) comprises, for each reference word, determining a reference word recognition value based on each of the character values associated with each of the N-best characters used to form the reference word, each replacement word value for each reference word comprising a corresponding reference word recognition word value.

11. The method according to claim 10, wherein each reference word recognition value is determined by multiplying the character values obtained for the corresponding reference word.

12. The method according to claim 11, wherein the step e) comprises including in the subset of reference words only those reference words that are present in a dictionary.

13. The method according to claim 12, wherein the reference word selected in step f) corresponds to the reference word associated with a highest replacement word value.

14. The method according to claim 13, wherein the reference word selected to replace the misrecognized word in step f) has a replacement word value at least as great as a predetermined threshold.

15. The method according to claim 9, wherein for each reference word the step d) comprises:
   i) determining a reference word recognition value based on each of the character values associated with each of the N-best characters used to form the reference word,
   ii) generating a plurality of grammar values based on the misrecognized word, each grammar value corresponding to a different part of speech, and
   iii) determining for the reference word a composite value based on the corresponding reference word recognition value and on one of the plurality of grammar values corresponding to the part of speech of the reference word, each replacement word value comprising a corresponding composite value.

16. The method according to claim 15, wherein the step b) further comprises:
   i) determining, if the recognized word is correctly spelled, whether the recognized word is grammatically correct; and
   ii) determining, if the recognized word is spelled correctly and is grammatically correct, whether the recognized word is contextually correct.

17. The method according to claim 15, wherein each reference word recognition value is determined by multiplying together each of the character values associated with each of the N-best characters used to form the reference word, and wherein each composite value is determined by multiplying each reference word recognition value with one of the plurality of grammar values associated with the part of speech of the corresponding reference word.

18. The method according to claim 9, wherein each character value is a probability value.

19. The method according to claim 1, wherein the at least one word in the document comprises a printed word appearing on a physical document.

20. The method according to claim 1, wherein the at least one word in the document comprises a handwritten word appearing on a physical document.

21. The method according to claim 1, wherein the recognized word is provided by an optical character recognition technique.

22. An apparatus for recognizing at least one word in a document, the word including at least one predetermined character, the apparatus comprising:
   a) means for providing a recognized word based on the word in the document;
   b) first determining means for determining whether the recognized word matches the word in the document, the recognized word comprising a misrecognized word in the absence of a match with the word in the document;
   c) means for generating a set of reference words if the first determining means produces the misrecognized word, wherein each one of the reference words comprises a different set of characters;
   d) second determining means for determining for each of the reference words a corresponding replacement word value;
   e) means for reducing, prior to selecting the reference word for replacing the misrecognized word, an amount of reference words from the set of reference words in order to form a subset of reference words from the set of reference words by eliminating according to an elimination operation any reference word that does not belong to a predetermined vocabulary, the subset of reference words being limited to only those reference words that belong to the the determined vocabulary, the elimination operation being different than the generating of the set of reference words; and
   f) means for selecting from the subset of reference words one reference word for replacing the misrecognized word based on the replacement word values of the corresponding reference words in the subset of the reference words.

23. The apparatus according to claim 22, wherein the means for providing the recognized word comprises:
   i) means for providing, for every character position of the word in the document, a set of N-best characters for occupying that character position, wherein N is an integer greater than zero; and
   ii) means for generating the recognized word based on the set of N-best characters provided for every character position of the word in the document.

24. The apparatus according to claim 23, wherein the first determining means comprises means for determining whether the recognized word is spelled correctly, wherein each of the reference words is determined based on the set of N-best characters provided for every character position of the word in the document.

25. The apparatus according to claim 24, further comprising means for associating a character value with each one of the N-best characters provide for every character position of the word in the document.

26. The apparatus according to claim 25, wherein the second determining comprises, for each reference word, means for determining a reference word recognition value based on each of the character values associated with each of the N-best characters used to form the reference word, each replacement word value for each reference word comprising a corresponding reference word recognition word value.

27. The apparatus according to claim 25, wherein the second determining means comprises:
   i) means for determining a reference word recognition value based on each of the character values associated with each of the N-best characters used to form the reference word,
   ii) means for generating a plurality of grammar values based on the incorrect recognized word, each grammar value corresponding to a different part of speech, and
   iii) means for determining for the reference word a composite value based on the corresponding reference word recognition value and on one of the plurality of grammar values corresponding to the part of speech of the reference word, each replacement word value comprising a corresponding composite value.

28. The apparatus according to claim 27, wherein the first determining means comprises:

i) means for determining, if the recognized word is correctly spelled, whether the recognized word is grammatically correct; and ii) means for determining, if the recognized word is spelled correctly and is grammatically correct, whether the recognized word is contextually correct.

29. An apparatus for recognizing at least one word in a document, the word including at least one predetermined character, the apparatus comprising:

a scanning device; and a processing device in communication with the scanning device, wherein the processing device comprises:
 a central processing unit,
 an optical character recognition module in communication with the control processing unit,
 a character memory in communication with the central processing unit,
 a word checking module in communication with the central processing unit, and
 a word correction module in communication with the central processing unit for generating a set of reference words if the processing device misrecognizes the word in the document, wherein before the processing device selects one of the reference words as a replacement for the misrecognized word, the processing device reduces an amount of reference words from the set of reference words in order to form a subset of reference words from the set of reference words by eliminating any reference word that does not belong to predetermined vocabulary, the subset of reference words being limited to only those reference words that belong to the predetermined vocabulary, and wherein the processing device selects the replacement for the misrecognized word from the subset of reference words.

30. The apparatus according to claim 29, wherein the word checking module comprises at least one of a spell checking module, a grammar checking module, and a natural language module.

31. The apparatus according to claim 30, wherein the processing device further comprises:

a data input device in communication with the central processing unit; and a display device in communication with the central processing unit.

32. The method according to claim 1, wherein:

the step a) includes the step of generating for each character position of the word in the document a set of characters, each word in the document being associated with a different group of sets of characters, and each reference word associated with the misrecognized word is derived from the group of sets of characters generated for the misrecognized word.

33. The apparatus according to claim 22, wherein:

the means for providing the recognized word includes means for generating for each character position of the word in the document a set of characters, each word in the document being associated with a different group of sets of characters, and each reference word associated with the misrecognized word is derived from the group of sets of characters generated for the misrecognized word.

34. The method according to claim 1, wherein the step e) includes the step of:

i) eliminating from the set of reference words each reference word that does not satisfy a predetermined criterion, the subset of reference words including each non-eliminated reference word.

35. The apparatus according to claim 22, wherein the means for reducing the amount of reference words includes:

i) means for eliminating from the set of reference words each reference word that does not satisfy a predetermined criterion, the subset of reference words including each non-eliminated reference word.

\* \* \* \* \*